April 14, 1970  E. W. MOLL  3,505,878
SPEED AND DISTANCE INDICATOR FOR A SKI DEVICE
Filed March 18, 1968  2 Sheets-Sheet 1

INVENTOR.
Edward W. Moll
BY Edward M. Farrell
ATTORNEY

April 14, 1970 E. W. MOLL 3,505,878
SPEED AND DISTANCE INDICATOR FOR A SKI DEVICE
Filed March 18, 1968 2 Sheets-Sheet 2
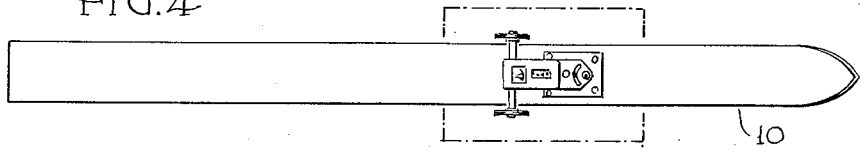
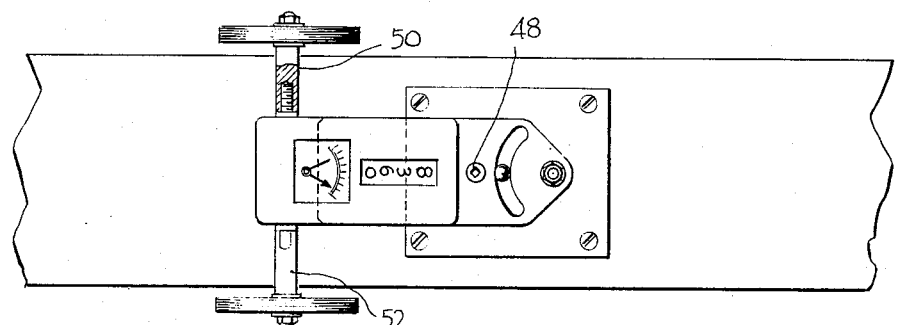
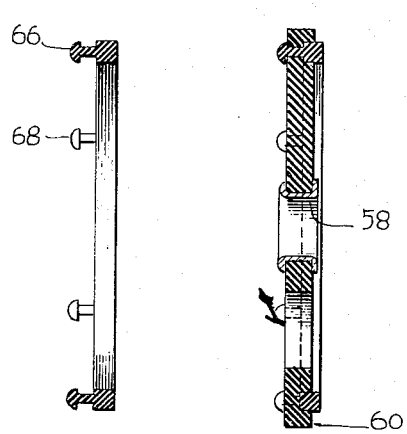
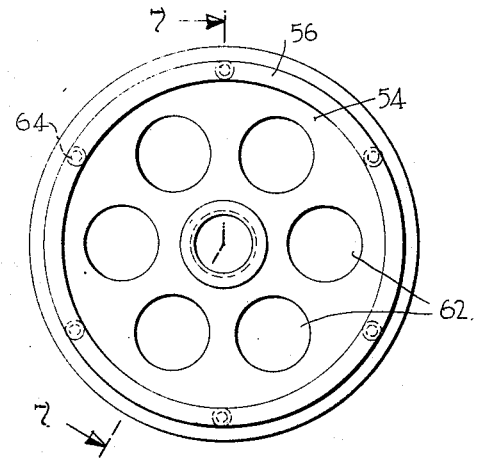
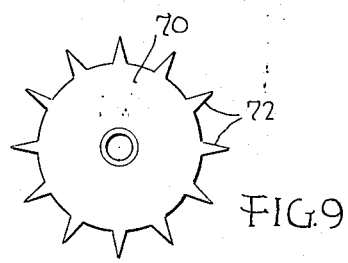
INVENTOR:
Edward W. Moll.
BY Edward M. Farrell
ATTORNEY United States Patent Office 3,505,878
Patented Apr. 14, 1970

3,505,878
SPEED AND DISTANCE INDICATOR FOR A SKI DEVICE
Edward W. Moll, 518 General Armstrong Road, King of Prussia, Pa. 19406
Filed Mar. 18, 1968, Ser. No. 713,890
Int. Cl. G01p 3/00
U.S. Cl. 73—490                     8 Claims

ABSTRACT OF THE DISCLOSURE

An indicator is mounted to a ski or surf board to engage snow or water to indicate the distance traveled, speed, or maximum speed attained by a skier or surf board rider. Inertia means are provided with the indicator so that the measurement continues when the skier or surfer is free of the snow or water. The indicator may be mounted to provide linear measurements for different directions of travel.

The sports of skiing on snow or water and surfing on surf boards have become increasingly popular in recent years. With the advent of such popularity has come an interest in a number of the competitive aspects related to the sports which lend additional enjoyment to the sportsman.

Because of the competitive interest skiing and surf board riding, it would be desirable to provide information relative to the sports, such as the speed traveled, the maximum speed traveled and the total distance traveled. At the present time, as far as is known, there are no convenient and economical ways of attaining this information.

It is well known of course that the information referred to have been derived in connection with various devices other than skis or surf boards. Speedometers, odometers, accelerometers and a wide variety of measuring devices have been used in connection with automobiles, airplanes, distance measurement devices and vehicles of many different sizes and types.

One of the problems involved in obtaining information relative to skiers and surfers is that the sportsman manning the skis or surf board is often out of physical contact with the surface on which he is riding For example, he may be in the act of jumping in the air. This distance would normally be unmeasured by many conventional devices. A problem which must be taken in account is the fact that the direction traveled is often not a straight line requiring that measurements be taken even when side slipping or turns are involved.

It is an object of this invention to provide a novel indicating device adapted to be connected to a ski or surf board.

It is a further object of this invention to provide an improved device for indicating the total distance traveled by a sportsman on skis or a surf board and maintaining an indication of that maximum speed after a trip.

It is still a further object of this invention to provide an improved indicating device for speed and distance measurements which is readily adaptable to be attached to existing equipment without adversely affecting the operation of the ski or surf board to which it is mounted, as well as being made an integral part of the ski or surf board.

It is still a further object of this invention to provide an improved indicating device for speed and/or distance measurements which is adapted to be attached to different locations on the ski or surf board.

In accordance with the present invention, an indicator for speed and/or distance traveled is mounted to a ski or surf board. Rotatable means are disposed to frictionally engage snow or water is connected to actuate the indicator. The frictional engagement between the snow, ice, water or whatever and the rotational means causes the indicator to respond to indicate desired information upon completion of a trip, or a time period by a sportsman mounting the skis or surf board. Inertia means are associated with the rotational means to permit it to continue to rotate for a short periods of time while the sportsman is in the air during jumps or the like. The indicator may be pivotally mounted to permit the rotational means to follow the direction of travel of the sportsman.

Other objects and advantages of the present invention will be apparent and suggest themselves to those skilled in the art, from a reading of the following specification and claims, in conjunction with the accompanying drawings, in which:

FIGURE 4 is a top view of an indicating device mounted at a different position on a ski than that illustrated in FIGURES 1 to 3 in accordance with the present invention;

FIGURE 5 is an enlarged view of the same indicating device, partly in cross section, of the same indicating device illustrated in FIGURE 4.

FIGURE 6 is an enlarged view of a wheel which may be used with the indicating devices previously illustrated;

FIGURE 7 is a cross-sectional view of the wheel taken along lines 7—7 of FIGURES 6;

FIGURE 8 is a side view of an element removed from the wheel illustrated in FIGURES 6 and 7; and FIGURE 9 is a front view of another type wheel which may be used with the indicating devices previously illustrated, in accordance with the present invention.

In describing the present invention, an indicating device as it is applied to a skier will be described. It is apparent that the device described could also be mounted to a surf board with little or modifications. In the interest of clarity and avoidance of repetition of description, the sportsman with a surf board or water skis and its associated indicating device will not be shown or described. In describing the present invention in connection with a snow surface it is understood that this term would include ice, ground and water surfaces contacted by a skier.

Figure 1:
FIGURE 1 is a view of a skier on skis, in which one of the skis includes an indicating device mounted at the rear thereof.
Figure 2:
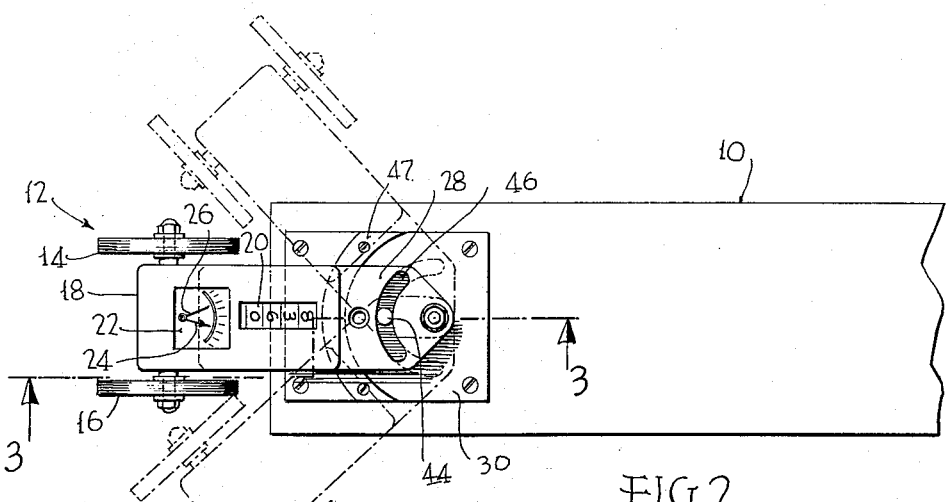
FIGURE 2 is a top enlarged view of the indicating device mounted to a ski, as illustrating in FIGURE 1, in accordance with the present invention.
Figure 3:
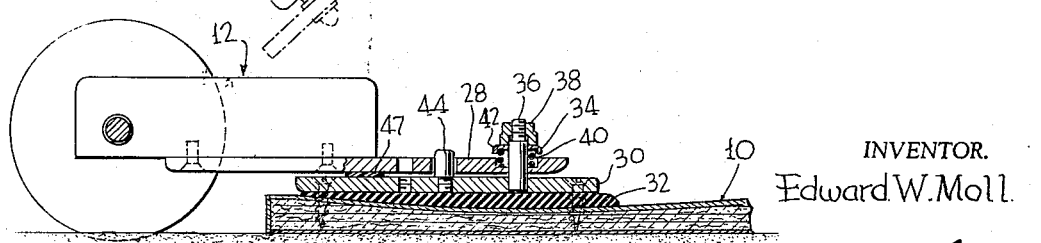
FIGURE 3 is a side view of the indicating device taken along lines 3—3 of FIGURE 2.

Referring to FIGURES 1, 2, and 3 of the drawing, a skier is illustrated skiing on snow in a normal manner. One of the skis 10 includes an indicating device 12 mounted at the rear thereof. The indicating device 12 includes rotatable means having a pair of wheels 14 and 16 disposed in frictional engagement with the snow or whatever surface on which the skier is riding.

The indicating device 12 comprises a housing adapted to receive the shafts or axles of the wheels 14 and 16. The wheels 14 and 16 are preferably provided with thread surfaces to insure good frictional engagement with the snow. The shafts of the wheels may be mechanically connected to a gear mechanism which steps down the number of revolutions of the wheel to drive gears which are mechanically connected to move elements 20 having indicia thereon. The indicator, being connected to respond to the revolutions of the wheels, may be designed to represent the actual distance traveled by a skier and may be calibrated in miles, sub-division of miles or miles or any other suitable type distance measurement desired.

A second indicia element 22 may be suitably connected to the gear chain of the wheels to indicate the speed of travel. While normally it is impossible for a skier to be concerned with his speed while he is skiing, it is noted that two pointers 24 and 26 are associated with the face of the indicia element 22. The pointer 26, for example, may be used to indicate the actual speed while the pointer 24 may be used to indicate the maximum speed attained. Such types of indicators with two pointers are conventional. The pointer 26 may be responsive to a resettable counter device calibrated to measure the distance traveled in miles, for example. The pointer 26 may correspond to the actaul movement of the wheels while the pointer 24 may correspond to the maximum speed attained by a skier. This latter pointer may utilize a rachet type or friction means to prevent the pointer 24 from returning from its maximum position unless specifically released by the skier or judge in a contest after the maximum speed has been noted or recorded. Means may be provided to reset the pointer 24 to zero after it has been noted or recommend.

The housing 18 is suitably mounted to a plate 28. A mounting plate 30 is secured to the ski 10 by screws or other suitable means, with the screws extending through a filler or spacer element 32, which may be rubber or other resilient material. It is noted that most conventional skies are somewhat curved thereby requiring an element similar to element 32. In addition, the resilient elements 32 and 40 provide a cushioning effect as the wheels 14 and 16 are ridden over uneven surfaces.

The plate 28 is pivotally mounted to the mounting plate 30 about a pivot pin 34 which is fixedly mounted to the mounting plate 30. The pin 34 includes a threaded end portion 36 adapted to threadedly receive a nut 38. A spring element 40 is disposed in tension about the pin 34 between the nut 38 and a recess 42 within the plate 28. This arrangement makes it possible to provide some resilience in the event that the wheels 14 and 16 land on snow before the main ski causing them to move out of their normal plane. The resilient arrangement minimizes the likelihood of shock or damage to the parts involved and further allows following varied terrain.

A guide pin 44 is also fixedly mounted to the mounting plate 30. The plate 28 includes an arcuate elongated slot 46 adapted to receive the guide pin 44. The arcuated slot with the guide pin provides maximum limits of pivotal movement for the plate 28. The degree of movement permitted is designed to accommodate the practical limits of angular turns made by a skier. The dotted lines represent the possible degree of movement of the plate 28. A low friction bearing element 47, which may be teflon or the like, is disposed between the plates 28 and 30.

The bottom portions of the wheels 14 and 16 are generally disposed slightly below the bottom portion of the ski 10. This permits the wheels to penetrate slightly into the snow and provide good frictional engagement therewith to cause the wheels 14 and 16 to move in accordance with the forward movement of the ski. In some cases, it may be desirable to use wheels similar to that illustrated in FIGURE 9, where teeth are disposed about the periphery of the wheel and disposed to dig into the snow to assure better frictional engagement and minimize the possibility of slippage as may be present in some cases if conventional threaded wheels are used.

It is noted that in the arrangement illustrated, the correct distance traveled by a skier is measured when the skier is making sharp turns wherein the actual distance traveled may far exceed the linear distance traveled.

Referring to FIGURES 4 and 5, the indicating device, substantially the same as that illustrated in FIGURES 1, 2 and 3, is mounted at a position between the ends of the skis. The basic operation of the indicator is the same as that previously described and hence its description will not be repeated. If mounted toward the front, the indicator may be viewed by the skier, especially after he stops and wants to determine the maximum speed at which he was traveling. Other conditions may make it undesirable to have the indicating device pivotally mounted at the rear of the ski thereby making the arrangement useful. When used in the manner illustrated, the plate 28 will be held fixedly in place on the ski by means of a screw 48.

It is noted that the space between the two wheels 14 and 16 is greater in FIGURES 4 and 5 than it was in FIGURES 1, 2, and 3. Adapter shafts 50 and 52 are used to accommodate this difference in space. These shafts are designed to threadedly engage the main shafts which in turn drive the gear train to actuate the indicating device.

It is noted that the same basic unit is used as the indicating means regardless of its position on the ski. The device therefore is versatile to take care of different desires of a skier with regard to the location of the device. At the same time advantages are afforded a manufacturer who may now make a standard basic unit interchangeable for all positions on the ski.

An important feature of the subject invention, as previously mentioned, is in providing a true distance traveled indicator which will record when the skier is in the air, during jumps, for example. This feature is provided by specially designed wheels which provide inertia means so that the wheels will tend to continue to turn even when the skier is out of contact with the snow. An effect somewhat similar to a flywheel is taken advantage of in the present invention.

Referring to FIGURES 6, 7, and 8 a wheel 54 includes a snap on rim 56. The wheel may be made of flexible material, such as hard rubber, and include a central hub element 58 which may be made of metal. The outer periphery of the wheel may include a somewhat thickened portion 60 to provide increased surface for friction contact with the snow. A plurality of spaced apertured 62 are provided in the wheel 54 to minimize the weight towards the inner portion of the wheel.

The wheel 54 also includes a plurality of smaller holes 64 disposed close to the outer edge of the wheel. These holes are dimensioned to receive tab elements 66 which form an integral part of the rim 56. The rim 56 may be made of relatively heavy material and may be hard plastic, metal or the like. The tabs 66 of the rim 56 are snapped into the openings 64 of the wheel. The protruding head 68 of the tabs prevent them from being readily removed once they are inserted into the wheel. This arrangement makes it possible to provide rims of different weights for the wheel. For example, it may be desired to have greater inertia for the wheel under certain conditions than under other conditions. A heavier rim will provide more inertia and maintain the wheel rotating for a greater time while the skier is jumping or in the air. Also, the wheels themselves are readily changeable to provide different inertias or other factors relating to a particular environment and performance desired.

The basic idea surrounding the inertia device is to provide a wheel which is relatively light towards the interior and relatively heavy at its outer periphery. It is apparent that such inertia devices may take a wide variety of different forms other than that illustrated.

Referring particularly to FIGURE 9, a different type of wheel is illustrated which may be used with the indicating device of the present invention. The wheel 70 includes a plurality of equally spaced teeth 72. The teeth 72 are adapted to dig into the lighter snow to provide firm engagement to drive the wheel and the indicating device. The teethed wheel is especially adaptable for use with a surf board for use in water.

While the subject invention has been described in connection with snow, it is recognized that numerous innovations has come into vogue in the sport of skiing. For example, plastic or low friction skies may be used in connection with other low friction surfaces, which may involve sand or low friction chemicals, such as nylons or the like. The indicator device of the subject invention may of course be used in connection with such skies and surfaces mentioned.

The present invention has thus provided a novel indicator device to permit sportsmen to determine such things as distance traveled, speed, and maximum speed traveled by a skier or surf board rider. Such information leads to greater interest by providing a competitive interest between those engaged the sports.

The indication device provided is relatively simple in construction, may be mounted at different places and provides true measurements taking into account changes in angular directions and the fact that the person may be out of contact with the snow or water parts of the time.

When employing the present invention with surf boards, it may be desirable to provide a wheel such as that illustrated in FIGURE 9 wherein the teeth may be in the form of small paddles to achieve greater surface area contact with the water.

What is claimed is:

1. In combination with an elongated ski adapted to ride over a surface covered with snow, an indicator mounted to said ski, and a pair of wheels connected to said ski and disposed on either side of said indicator, said wheels being drivingly connected to said indicator device, said wheels including a plurality of projecting teeth about their peripheries disposed to dig into said snow to actuate said indicator device in accordance with the relative movement between said ski and said surface.

2. The invention as set forth in claim 1 wherein said pair of wheels and said indicator are pivotally mounted towards the rear of said ski to permit said pair of wheels to follow the directions of relative movement of said ski with respect to said surface.

3. The invention as set forth in claim 1 wherein said pair of wheels includes inertia means connected thereto to permit said pair of wheels to continue to rotate for a perid of time when said pair of wheels is rotating and temporarily moves out of engagement with said surface.

4. The invention as set forth in claim 3 wherein said pair of wheels includes relatively heavy peripheral portions with respect to their inner portions to provide said inertia means.

5. The invention as set forth in claim 4 wherein said indicator device comprises means for indicating the total distance traveled by a person riding on said ski.

6. The invention as set forth in claim 5 wherein said indicator device further includes means for maintaining and indicating the maximum speed attained by a person riding on said ski.

7. The invention as set forth in claim 5 wherein said indicator device is mounted to a plate member, with means including a bias spring being provided to resiliently connect said plate member to said ski to accommodate vertical movements of said rotatable element from its normal plane with respect to said ski.

8. The invention as set forth in claim 7 wherein said plate member includes an arcuate slot for receiving a pin element mounted in fixed relationship with respect to said ski to provide limiting means, for the angular movement of said plate member with respect to said ski.

References Cited

UNITED STATES PATENTS

| | | | |
|---|---|---|---|
| 16,333 | 1/1857 | Gray et al. | 73—185 |
| 847,996 | 3/1907 | Agnell | 33—141 |
| 1,755,184 | 4/1930 | Martinet | 73—491 |
| 2,228,990 | 1/1941 | Everson | 33—141 |
| 2,279,409 | 4/1942 | Milster | 73—128 |
| 2,325,910 | 8/1943 | Hetzel | 73—128 |
| 2,716,819 | 9/1955 | Staples | 33—141 |
| 745,726 | 12/1903 | Hathaway | 73—529 |

JAMES J. GILL, Primary Examiner

H. GOLDSTEIN, Assistant Examiner

U.S. Cl. X.R.

73—493